F. DROBNIAK & J. PLANECKI.
CASH ISSUING, INDICATING, AND REGISTERING APPARATUS.
APPLICATION FILED JULY 8, 1907.
932,973. Patented Aug. 31, 1909.
5 SHEETS—SHEET 4.
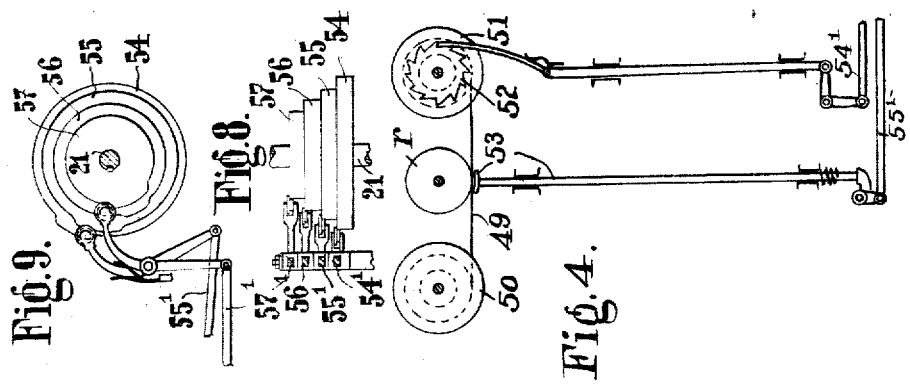
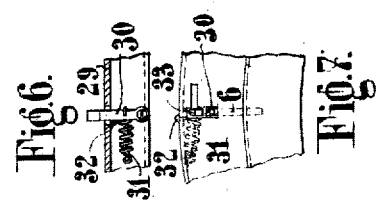
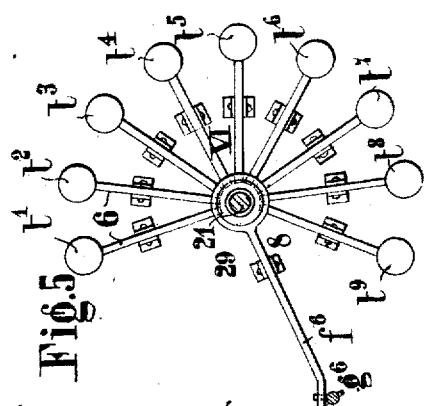
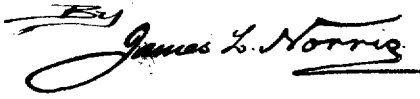

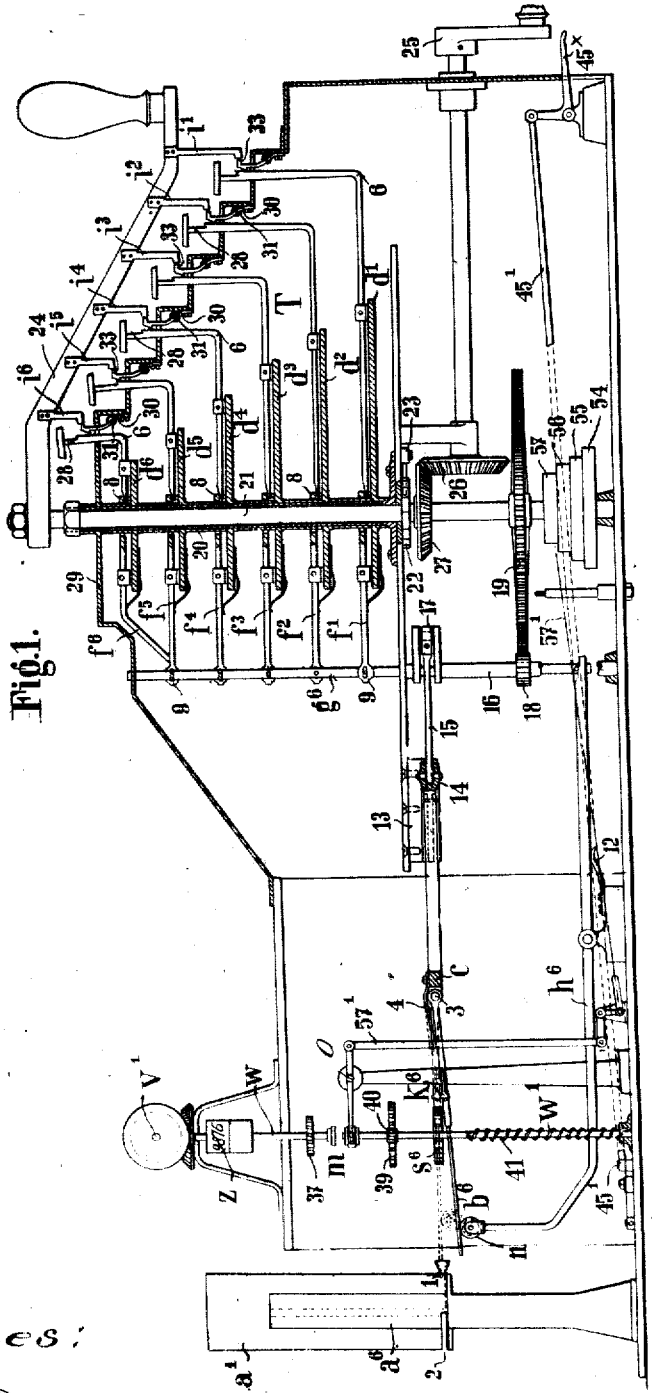

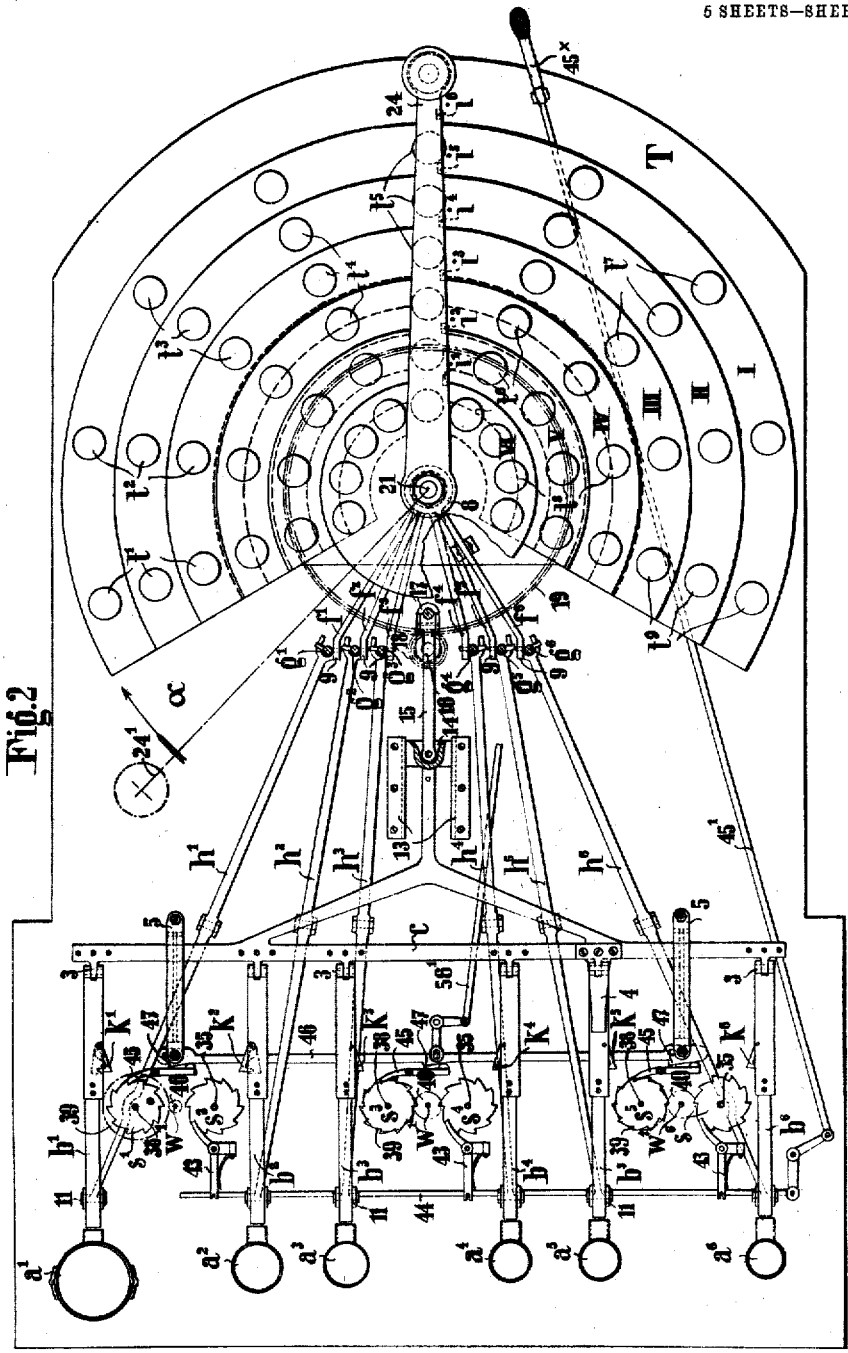

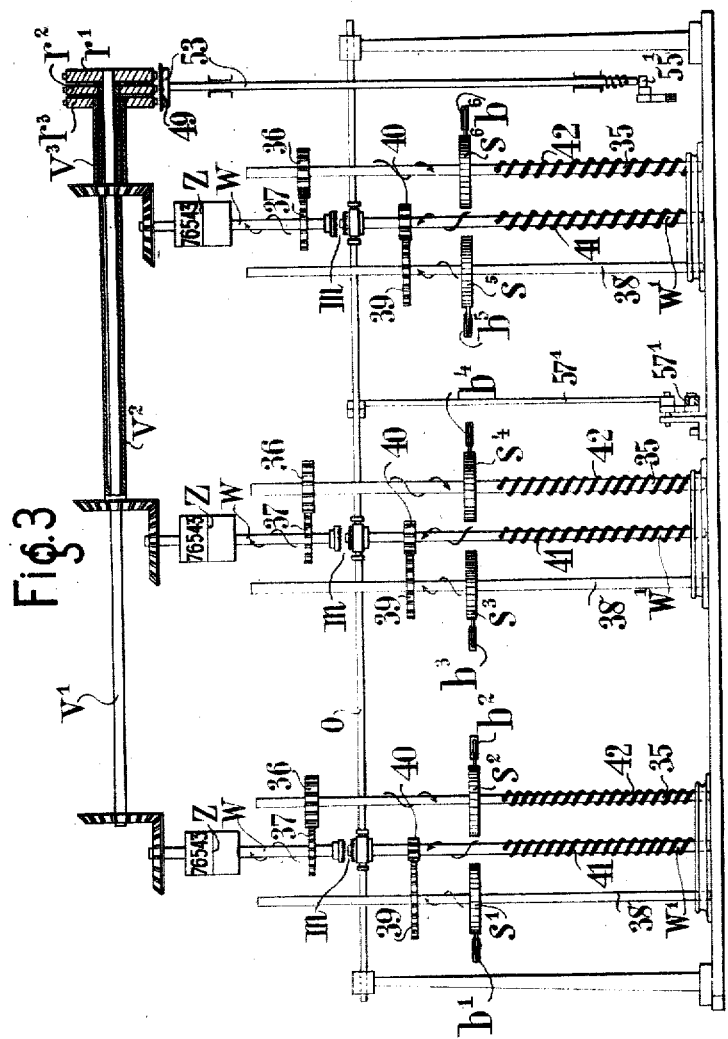

F. DROBNIAK & J. PLANECKI.
CASH ISSUING, INDICATING, AND REGISTERING APPARATUS.
APPLICATION FILED JULY 8, 1907.
932,973.
Patented Aug. 31, 1909.
5 SHEETS—SHEET 5.
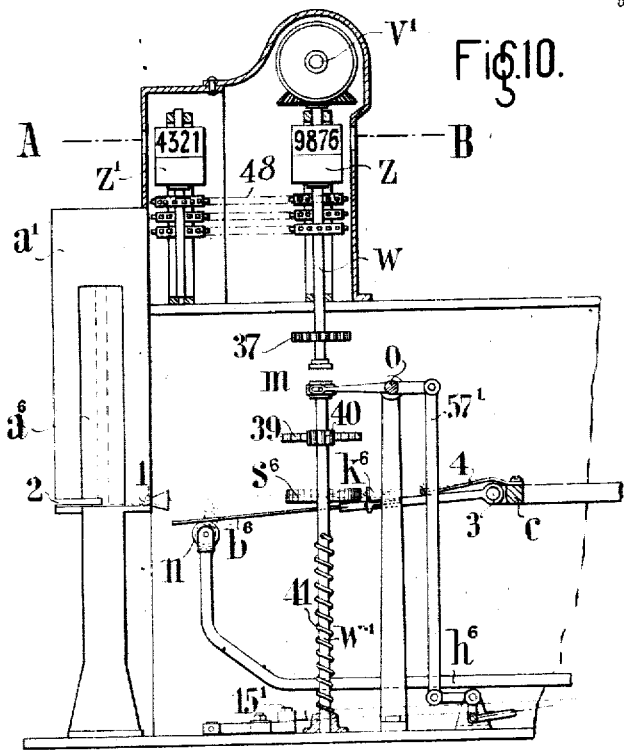

UNITED STATES PATENT OFFICE.

FRANZ DROBNIAK, OF JAWISZOWICE, AND JOHANN PLANECKI, OF KRAKAU, AUSTRIA-HUNGARY.

CASH ISSUING, INDICATING, AND REGISTERING APPARATUS.

932,973. Specification of Letters Patent. Patented Aug. 31, 1909.

Application filed July 8, 1907. Serial No. 382,782.

*To all whom it may concern:*

Be it known that we, FRANZ DROBNIAK and JOHANN PLANECKI, subjects of the Emperor of Austria-Hungary, residing at Jawiszowice and Krakau, respectively, in Galicia, Austria-Hungary, have invented certain new and useful Improvements in Cash Issuing, Indicating, and Registering Apparatus, of which the following is a specification.

This invention relates to a cash till which serves for paying out amounts of money in coin of any kind of currency and any number of different kinds of coin, and which shows the amounts paid out and prints the same on a registering strip. This cash paying till, in which the coins of the same kind are piled in receptacles and are ejected singly by ejecting devices, is distinguished mainly by the fact that the coin ejecting slides that are usually in an inoperative position and that are operated by a crank mechanism common to all, are brought into action selectively by means of the keys of a keyboard. The keys of the latter are arranged in groups, the number of which corresponds to the number of different coins dealt with by the apparatus. Each key is held in the depressed position after it has put in action the coin ejector belonging to its group and is released by an arm that is passed by hand over the keys and which may be formed as a crank handle, the corresponding ejector being made, during the motion of the arm (which only moves in one direction) from its zero position to the depressed key, to perform a number of to and fro movements corresponding to the numeral marked on the key, so as to eject a corresponding number of the same kind of coin. The ejectors that are put in action actuate during their forward motion, a control apparatus which renders visible the paid out sum of money in the usual figures and symbols (pounds, shillings, and pence, or other coinage), and which sets in position the type wheels of a printing apparatus for printing the amount of money paid out on a paper strip.

Figures 1 and 2 of the drawings accompanying the present specification show respectively a longitudinal section and plan of a cash paying till constructed according to the present invention; Fig. 3 shows the control apparatus and the adding up and printing devices in connection therewith, viewed from the side at which the coins issue. Fig. 4 shows the printing apparatus separately, Fig. 5 a plan of one of the groups of keys and parts connected therewith; Figs. 6, 7 and 8, 9 show two details of the apparatus in elevation and plan. Fig. 10 represents a longitudinal section of the rear portion of the cash issuing apparatus showing two rows of numeral drums; and Fig. 10' represents a section on the line A—B of Fig. 10, the lower mechanism being omitted from this figure for clearness.

The coins to be dealt with are piled separately in fixed cylindrical receptacles $a^1$, $a^2$ ... which are preferably provided with a longitudinal slot covered with glass or other transparent material and have external vertical division lines, so that the number of coins contained in the receptacles can be easily ascertained. Next to the bottom of each receptacle there is formed in the side wall thereof a front opening 1 for the entrance of the coin ejecting device and a back opening 2 for the issue of the bottom coin of the pile.

The ejection of the coins from the receptacles is effected by the corresponding ejecting slides $b'$ $b^2$ $b^3$ $b^4$ ... which are all pivotally connected to a transverse bar $c$ by pivots 3 and are held by springs 4 in the lowered position in which, when the transverse bar $c$, sliding in guides 5, is moved to and fro, the ejecting slides can move idle to and fro without ejecting coins.

Each of the ejecting slides can be so raised independently of the others, that when moved toward the corresponding coin receptacle, it will enter the said opening 1 thereof and will eject a coin through the opening 2 thereof. For insuring the reliable entrance of the ejecting slides into the coin receptacles, the opening 1 has inclined sides forming a funnel-shaped mouth for the entrance of the ejecting slide.

The moving of the slides into the operative position, indicated by dotted lines in Fig. 1, is effected by a keyboard device T. The latter has as many groups of keys as there are coin receptacles. In the construction shown there are six coin receptacles $a'$ to $a^6$ (such as for 5 kronen-, 1 kronen-, 20 heller-, 10 heller, 2 heller- and 1 heller-pieces of Austrian currency), there are therefore also provided six groups of keys I to VI, which are advantageously arranged stepwise in concentric circular arcs, as shown. The keys $t'$, $t^2$ ... are mounted on the ends of levers 6 which are pivotally mounted upon fixed disks or plates $d'$ $d^2$. ... Each of the disks carries all the key levers 6 belonging to one group, the rear ends of such levers being engaged under a common ring 8. The rings 8 constitute the front ends of the transmitting levers $f'$ $f^2$ ... belonging to the key lever groups and subject to spring action, each of which levers engages by means of its rear slotted or forked end 9 with a corresponding vertically movable and guided rod $g'$ $g^2$. ... The lower end of each of the rods rests upon the end of corresponding engaging levers $h'$ $h^2$ ..., the rear ends of which carry a smooth round pin, or, as shown, a roller 11, and are held by springs 12 in the position shown at Fig. 1. The pins or rollers 11 constitute the rear supports for the expelling slides $b'$ $b^2$ ... which can move to and fro upon the same without friction.

The transverse bar $c$ which actuates the expelling slides $b'$ $b^2$ ... is connected to a slide 14, movable in guides 13, and connected by a rod 15 with the pin of a crank 17 formed on a crank shaft 16. The shaft 16 carries a toothed pinion 18 gearing with a toothed wheel 19 on a shaft 21 passing through the supporting tube 20 of the disks $d$ and rotatable therein.

With a ratchet wheel 22 on shaft 21 engages a spring pawl 23 which only allows of the rotation of shaft 21 in one direction and prevents its backward motion. On the upper end of shaft 21 is fixed an arm 24 which, as shown, can be formed as a crank handle by means of which the shaft 21 can be rotated. The rotation of the shaft in one direction can however also be effected as shown, by a special crank handle 25 the motion of which is transmitted to the shaft by means of bevel wheels 26 and 27.

The arm 24, which in the present case is moved from the zero or initial position 24′ (Fig. 2) in the direction of the arrow $\alpha$ carries for each key group a downward extension of which, as shown, there are six, viz. $i'$ to $i^6$ serving the following purpose.

Each of the keys $t$ when depressed for putting in action the corresponding expelling slide is held in the lowered position. For this purpose the key lever 6 is provided with a notch or shoulder 28, while at the inner side of the top 29 of the casing, which is correspondingly stepped, there are provided hooked levers 30 pivotally mounted on horizontal pins, and having spring action in the direction at right angles to the pivotal motion, of which levers there is one for each key lever. Each hook lever 30 is pressed by a lateral spring 31 against a stop 32 at the side of the spring for limiting the motion (Figs. 6 and 7) and on the side opposite the hook the lever 30 is provided with a beak 33 which, in the normal position of the hook lever 30 (when the key is in the raised position), is outside the path of the corresponding projection $i'$ $i^2$ ... of the key group so that the projection and arm can move past it unhindered on the rotation of the arm. When, however, a key is depressed, the corresponding hook lever 30 engages with a notch 28 of the key lever 6 which at the same time presses the spring hook lever forward, i. e., to the right hand (Fig. 1) so that the beak 33 of this hook lever projects into the path of the arm projection $i'$ $i^2$ .... The key $t$ and its lever 6 are therefore held in the lowered position until the arm 24 in being moved from its initial position 24′ in the direction of the arrow $\alpha$, arrives at the depressed key, when its projection $i'$ $i^2$ ... in bearing laterally against the beak of the hook lever 30, presses it against the action of its spring 31 laterally out of the notch of the key lever 6 thus releasing the latter. The key then returns under the action of the spring transmitting lever $f'$ $f^2$ ... back into the raised position and the arm 24 can now continue its rotation as the beak 33 of the hook lever has moved inward again.

The keys $t'$ $t^2$ ... of each group I to VI are marked with 1, 2, 3 ... in the direction starting from the initial position 24′ of the arm 24. In all those cases in which the payment in coin of a decimal coinage system each of the groups I to VI of the keyboard $t$ contains nine keys $t'$ to $t^9$ and all the keys of the same numeral order are arranged in one and the same radius, as shown at Fig. 2. The toothed wheel transmission 18, 19 is so chosen that on the motion of the arm 24 from the zero position up to a certain key, the pinion 18 makes as many revolutions as corresponds to the numeral of this key. Thus if, for example, the key $t^6$ of the group II be depressed and the arm 24 is moved from 24′ up to this key $t^6$ (II) the expelling slide $b$ of this group (which is put in action by the depressed key) will be moved six times to and fro by the pinion 18 and crank 17, and will eject six coins of the corresponding kind. As soon, however, as the arm 24 arrives at the depressed key and disengages the same in the above described manner, the key lever 6 returns into its initial position, when the expelling slide $b$ of the group containing the depressed key will be lowered into the inoperative position, shown by the full lines at Fig. 1, and on the further rotation of the arm 24 or of the crank handle 25 it will move idly to and fro upon the roller 11 underneath the corresponding coin receptacle $a$. In order therefore to eject a certain number of coins of the same kind it is only necessary to depress a single key of the key group corresponding to this coin, viz. that one, the numeral of which corresponds to the number of coins to be ejected. In the arrangement shown by way of example on the drawings the transmission ratio between wheel 19 and pinion 18 is chosen as 1 to 15. Of the fifteen revolutions of the wheel 18 effected by a single revolution of the wheel 19, only nine revolutions are employed for expelling the coin, as each group only contains nine keys. The keys therefore only extend over a sector of 216° (9/15×360° as shown at Fig. 2). During the motion of the arm 24 commencing at the zero position 24′ through an arc corresponding to the extent of this sector the delivery of coin takes place. The arm 24, which can only be turned in one direction must, after passing the last radial row of keys of the highest number (keys $t^9$) be further rotated in the same direction until it arrives at the zero position 24′, during which motion the arm passes through an arc of 144° (360°−216°). During this motion the following operations are performed.

The described coin paying till is, as before stated, provided with an arrangement which renders the paid amount visible for the purpose of control and also prints the same upon a control strip; this apparatus is constructed as follows: Each of the expelling slides $b$ carries on one side a spring ratchet pawl $k'$ $k^2$ ... which in the inoperative or lowered position of the slide moves to and fro idly with the same. When, however, the expelling slide is raised into the operative position the pawl $k'$ $k^2$ ... engages with a corresponding ratchet wheel $s'$ $s^2$ ... during the forward motion of the slide toward the coin receptacle and thereby effects a partial revolution of the ratchet wheel at each to and fro motion of the slide.

For the practical application of the apparatus it is necessary to render the paid out amount visible in the usual writing in the units of the currency, of whatever kind of coin it may be composed. For this purpose the arrangement is such that only the ratchet wheels $s^2$ $s^4$ and $s^6$ corresponding to the main or unit steps (such as one krone, ten hellers and one heller) transmit their motion directly to the counter device, while the higher coin values, which do not correspond to these main or unit steps, are converted into the next lower unit step, i. e. on ejecting each coin that does not correspond to a unit step the counter is actuated as though a number of coins of the next lower unit step, corresponding to the said coin, were ejected one after the other. On ejecting the two kinds of coin the operations effected by the motions of the two corresponding ratchet wheels have to be added together. For this purpose the following arrangement is provided which will be described with reference to the Austrian currency for which the apparatus shown on the drawing is arranged.

By means of the apparatus as before stated amounts can be paid out in six different kinds of coins; as unit steps 1 krone, ten hellers and one heller are assumed. Each of these unit steps is combined in a group with the next higher coin value.

The two ratchet wheels $s'$ $s^2$ ... of each of these groups are arranged between the two ejecting slides $b'$ $b^2$ ... belonging to this group, as shown at Figs. 2 and 3, so that the ratchet wheels are turned in opposite directions during the ejecting stroke of the slides. The ratchet wheel belonging to the unit step of each group ($s^2$, $s^4$, $s^6$) is fixed on a spindle 35 the rotation of which is transmitted to a spindle $w$ by means of toothed wheels of equal diameter 36 and 37, so that the transmission is as 1:1; upon the shaft $w$ is fixed a numeral drum $z$ belonging to the corresponding group in front of which there is provided, in the casing of the apparatus, a sight hole through which the numerals of the drum can be read.

Each of the other ratchet wheels ($s'$ $s^3$ $s^5$) is fixed upon a spindle 38 the rotations of which are transmitted by means of toothed wheels 39 and 40 to a spindle $w'$ situated between the spindles 35 and 38. The transmission ratio of wheel 39 to wheel 40 corresponds to the proportion of the values of the two coins belonging to a group. Consequently in the arrangement shown with the kronen group the transmission is as 1 to 5 (1 krone to 5 kronen) while with the two heller groups the transmission ratio is as 1 to 2 (10 to 20 or 1 to 2 hellers). Each shaft $w'$ is arranged co-axially with its corresponding shaft $w$ and can be coupled therewith by means of a clutch device $m$ of known construction, all of the said clutches being operable from a common rock shaft O which in turn is actuated by the elements 57′. Surrounding the shaft $w'$ is a coiled spring 41 the one end of which is fixed to the spindle $w'$ and the other end to a fixed part of the machine. On the spindle 35 carrying a ratchet wheel of the unit step there is also coiled a spring 42 which can be weaker than the spring 41. With the ratchet wheels $s^2$ $s^4$ $s^6$ belonging to the coin unit steps are engaged spring pawl levers 43 (Fig. 2) which prevent the backward motion of these ratchet wheels and which can be disengaged by means of a transversely movable bar 44 common to all; the said motion of the bar 44 is effected by hand by means of the pressing lever 45ˣ through the medium of the lever gear 45′ shown at Fig. 2.

With the other ratchet wheels $s'$ $s^3$ $s^5$ there are also engaged pawls 45 which prevent their backward motion and which are disengaged by a common transverse bar 46 preferably by means of inclines 47 formed thereon the movement of the transverse bar 46 is, however, not effected by hand but automatically on the rotation of the crank handle as will be presently described.

So soon as, after the setting of the keyboard to the amount to be paid out, the arm 24, or the crank handle 25, is turned, the ejecting slide belonging to a main or unit step (for instance slide $b^2$ of the Kronen group) effects directly the setting of the numeral drum $z$ to the numeral of the depressed main of unit step key as the corresponding ratchet wheel $s^2$ is directly connected with the drum spindle $w$. The adjacent ratchet wheel $s'$ belonging to the same numeral drum $z$, transmits the movements imparted to it by the ejecting slide $b'$ to the intermediate shaft $w'$ with the before mentioned ratio of transmission by which motion the spring 41 is put in tension. If now, after the putting out of action of the ejecting slide i. e. after the arm 24 has passed beyond the keyboard, the clutch $m$ is put in gear and the pawl 45 is disengaged, the strained spring 41 will effect a rotation of the spindle $w$ and numeral drum $z$ in the same direction as was effected by the spindle 35. The operations of the two ratchet wheels belonging to a numeral drum $z$ are consequently added together and the numeral drum $z$ will be set to the sum of the amounts of money which have been delivered by the two slides of this group. By this means the sum of the coin unit step is made visible because by the transmission wheel 39, 40 the translation of the coin of higher value into coin of the unit steps has been effected.

In order to effect a more perfect control it is necessary to indicate the amount paid out not only to the payor but also to the payee; for this purpose there are provided, as shown in Figs. 10 and 10', besides the numeral drums $z$ subsidiary drums $z'$ which render visible the paid amount at the sight holes of the casing that face the payee and that are rotated by means of gear from the drums $z$ as shown. The numerals upon the main drums $z$ are shifted 180° relatively to the same numerals of the subsidiary drums $z'$.

In order that the paid amount may be indicated by the two drums $z$ and $z'$ in correct writing the transmission is effected for example, by means of chains 48 (Fig. 10) in such manner that each of the main drums $z$ actuates the subsidiary drum $z'$ corresponding to the same main or unit step.

The main drum $z$ of the control apparatus effects the setting of the type wheels of a printing apparatus which prints the amount paid out upon a control strip; for this purpose the spindles $w$ transmit their motion to corresponding spindles $v'$ $v^2$ . . . which slide telescopically one within the other and carry respectively the type wheels $r'$, $r^2$, $r^3$ . . . arranged side by side and which are inked in the known manner. The paper strip 49 is passed underneath the type wheels between two rollers 50 and 51 of which 51 receives a step by step motion in the known manner by a ratchet device 52 at each movement of the crank handle, for feeding the strip forward. The printing from the adjusted type wheels is effected by means of a spring pressing stamp 53 which, after each setting of the type wheels, presses the strip 49 against the latter.

The actuation of the paper strip ratchet device 52 of the pressing stamp 53 of the release of the transverse bar 46 actuating the pawls 45 and of the couplings $m$ are all effected from the shaft 21. For this purpose the latter carries four cams 54, 55, 56, 57 which by means of lever gear 54' 55' 56' 57' operates the said parts.

The action of the entire apparatus is as follows: The keyboard is in the first instance set to the total amount of money to be paid out, whereupon the arm 24 is moved from the zero position 24' over the keys. By this motion the coins are ejected in the manner above described. After the arm 24 has passed beyond the last row of keys $t^9$ the coupling $m$ is put in engagement by means of the cam 57 on the further rotation of the arm, whereupon the pawls 45 are released by the cam 56 so that the numeral drums $z$ $z'$ and the type disks $r'$ $r^2$ $r^3$ are set to the amount paid out. By this operation the springs 42 connected to the shaft 35 are put in tension. On the further motion of the arm 24 the pressing stamp 53 is actuated by the cam 55, whereby the types corresponding to the amount paid out are printed upon the strip 49. After the printing stamp 53 has moved back again the cam 54 finally effects the forward motion of the strip 49, whereupon the arm 24 again arrives at the zero position.

Before a fresh paying out operation can be effected all the parts of the control and printing devices must be brought back into their initial or zero positions. This is effected by depressing the lever $45^x$ whereby the transverse bar 44 is shifted and the pawls 43 are disengaged from the ratchet wheels $s^2$ $s^4$ $s^6$ of the coin unit steps so that the strained springs 42 can come into action and bring the drums $z$ $z'$ as also the type wheels $r'$ $r^2$ $r^3$ back into the zero position.

In order to prevent the arm 24 when arriving in the zero position 24' from being moved beyond this position there is provided for the arm or crank a locking device which may, for example, consist of a spring catch of known construction that locks the arm when this arrives in the zero position. The release of this locking device can be effected by means of the lever $45^x$ through the medium of a suitable lever mechanism connecting the two, the arrangement being such that on the depression of the lever 45* the control devices are brought back into the zero position, while at the same time the arm 24 is released at the zero position.

The numeral drums z z' corresponding to the highest main or unit step (in the present case that for the Kronen) may have a considerable number of progressive numerals, the limit of which is determined by the greatest amount of money which can be paid out by the apparatus. If the apparatus is constructed for any other coinage system than a decimal one, the arrangement of the keyboard (number of the keys in each group I II...) and the control apparatus must be modified accordingly.

Claim.

1. In a coin handling apparatus, the combination with a plurality of coin receptacles, and individual ejectors adapted to coöperate therewith, of selecting keys for setting the ejectors in delivering position, an operating member common to all of the ejectors, and means for releasing and resetting the delivering ejectors to an inoperative position after they have been actuated a predetermined number of timed, the latter being controlled by the selecting keys.

2. In a coin handling apparatus, the combination with a plurality of coin receptacles, and individual ejectors therefor normally arranged in inoperative position relatively to the respective receptacles, of means for simultaneously operating all of the ejectors, selecting devices for setting the desired ejectors in operative position, and means for releasing and resetting the delivering ejectors to an inoperative position after they have been actuated a predetermined number of times.

3. In a coin handling apparatus, the combination with a set of coin receptacles, and ejectors therefor normally arranged in inoperative position, of means for simultaneously operating all of the ejectors of the set, a key-board having rows of keys corresponding to the respective receptacles, selecting devices connecting each row of keys to each corresponding ejector for setting the latter in delivering position, and means for releasing and setting back the delivering ejectors to an inoperative position after they have been actuated a predetermined number of times.

4. In a coin handling apparatus, the combination with a set of coin receptacles, and ejectors for delivering the coins therefrom, of an operating member common to all of the ejectors, a key-board having keys grouped according to the respective receptacles, selecting devices connecting each group of keys to a corresponding ejector for controlling the delivering operation thereof, limiting devices for each group of keys and serving to control the number of operations of the ejectors and consequently to control the number of coins delivered by the ejectors.

5. In a coin handling apparatus, the combination with a set of coin receptacles, ejectors therefor, and an operating member for simultaneously actuating all of the ejectors, of a key-board having keys grouped in rows according to the denominations of the coins in the respective receptacles, selecting devices connecting the keys of each row with the corresponding ejectors for setting the latter in delivering position, and devices coöperating with the keys of each row and releasable by the movement of the operating member for controlling the number of operations of the ejectors and consequently to control the number of coins delivered at each operation of the operating member.

6. In a coin handling apparatus, the combination with a set of coin receptacles, individual ejectors therefor, and a common operating member connecting the several ejectors, of a key-board having keys grouped in rows according to the denominations of the coins in the receptacles, selecting devices connecting the keys of each row to the respective ejectors for moving the latter into delivering position, and devices for retaining the keys of each row in actuated position and releasable by the movement of the operating member.

7. In a coin handling apparatus, the combination with a set of coin receptacles, ejectors therefor, and an operating member for actuating the ejectors, of a key-board having keys grouped according to the denominations of the coins in the receptacles, selecting devices connecting the keys of each group to the respective ejectors for setting the latter in delivering position, and a set of locking levers for the keys of each group and serving to retain the respective keys in actuated position, and means controlled by the position of the operating member for releasing the locking levers.

8. In a coin handling apparatus, the combination with a plurality of coin receptacles, ejectors therefor normally arranged in inoperative position, and an operating member for actuating the ejectors, of a key-board having the keys grouped in rows according to the denominations of the coins in the respective receptacles, selecting devices connecting the keys of each group for setting the respective ejectors in operative position, and a set of locking levers releasable by the movement of the operating member, and operating automatically to retain a key of any group in actuated position.

9. In a coin handling apparatus, the combination with a plurality of coin receptacles, a corresponding set of ejectors normally arranged in inoperative position, and means for actuating the ejectors, of selecting mechanism embodying a key-board having the keys grouped according to the denominations of the coins in the receptacles, the keys of each group being arranged progressively in rows, independent connections between each group of keys and its corresponding ejector for setting the latter in operative position when any key of its corresponding group is actuated and locking devices for the keys of each group releasable by the ejector operating means.

10. In a coin handling apparatus, the combination with a plurality of coin receptacles, ejectors therefor, a movable operating arm, and means connecting the latter to the ejectors for causing a predetermined number of operations thereof at each movement of the arm, of selecting devices grouped according to the denominations of the coins in the several receptacles and operatively connected to the respective ejectors for setting the latter in operative position, the keys of each group being spaced progressively according to the position occupied by the said arm corresponding to the number of times the ejectors are operated, and devices releasable by the said arm for retaining the keys of each group in actuated position.

11. In a coin handling apparatus, the combination with a plurality of coin receptacles, and ejectors therefor, of means for operating the ejectors, and a key-board having the keys grouped in concentric rows according to the denominations of the coins in the respective receptacles, an operating ring coöperating with the several keys of each row, actuating rods connected to the respective rings, and levers operable by the said rods for moving the respective ejectors in delivering position relatively to the receptacles.

12. In a coin handling apparatus, the combination with a set of coin receptacles, and a corresponding set of ejectors, an operating member for simultaneously actuating all of the ejectors, and means for setting back the delivering ejectors to an inoperative position after they have been actuated a predetermined number of times, of counting devices operated by the movements of the respective ejectors, a printing mechanism connected to the several counters, and means for automatically resetting the counters subsequent to each printing operation.

13. In an apparatus of the character described, the combination with the coin receptacles grouped according to the denominations of the coins, and ejectors for the respective receptacles, of a counting device for each receptacle, a printing mechanism connected to certain of the counters, adding devices actuating the printing mechanism a number of times according to the value of a coin of higher denomination.

14. In a coin handling apparatus, the combination with a plurality of coin receptacles, and ejectors therefor, of a counter for each receptacle, a printing mechanism directly connected to one of the counters, a multiplying device connected to either counter, and means for connecting the printing mechanism to the multiplying device for operating the latter according to the value of a coin of higher denomination.

15. In a coin handling apparatus, the combination with a plurality of coin receptacles, and ejectors therefor, of a pair of shafts carrying ratchet wheels, means operable by the respective ejectors for rotating the ratchet wheels, a printing mechanism directly connected with one of the shafts, an intermediate shaft, multiplying devices between the latter and the shaft carrying the other wheel, a clutch for connecting the intermediate shaft to the printing mechanism, and means for operating the intermediate shaft to set the printing mechanism.

16. In a coin handling apparatus, the combination with a plurality of receptacles for containing coins of different denominations, ejectors for the several receptacles, and a common operating member for the several ejectors, of a set of printing wheels set according to the number of operations of each ejector, and a printing stamp actuated automatically by the movement of the operating member.

17. In a coin handling apparatus, the combination with a plurality of receptacles, ejectors therefor, and an operating arm common to the several ejectors, of selecting devices for setting the respective ejectors in delivering position, counting devices actuated by the several ejectors, printing wheels set according to the respective counters, a printing stamp arranged to coöperate with the type wheels, means for returning the ejectors to normal inoperative position after a predetermined number of operations thereof, means for operating the printing stamp automatically by the movement of the operating arm, and resetting means for the counting devices.

In testimony whereof we have hereunto set our hands in presence of two subscribing witnesses.

FRANZ DROBNIAK.
JOHANN PLANECKI.

Witnesses:
JOSEF RUBUSCH,
ROBT. W. HEINGARTNER.